May 23, 1967
J. W. JACOBS
3,321,635
COULOMETRIC CONTROL
Filed Feb. 5, 1964
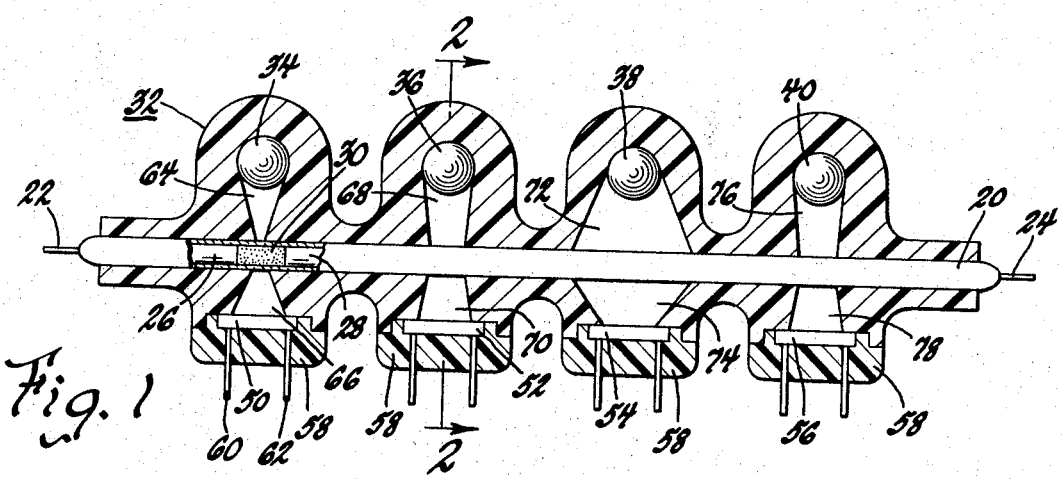
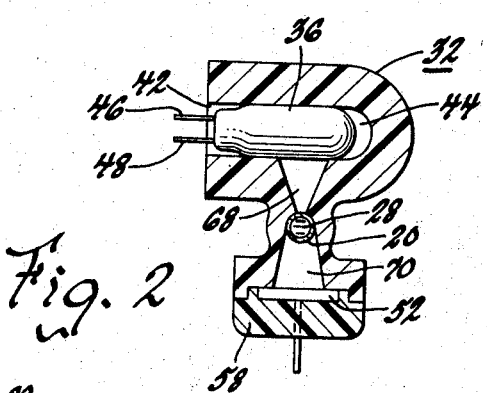
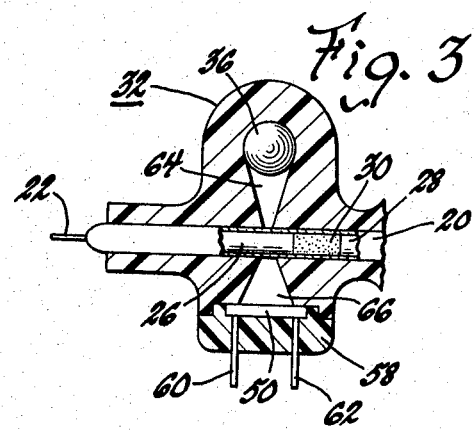
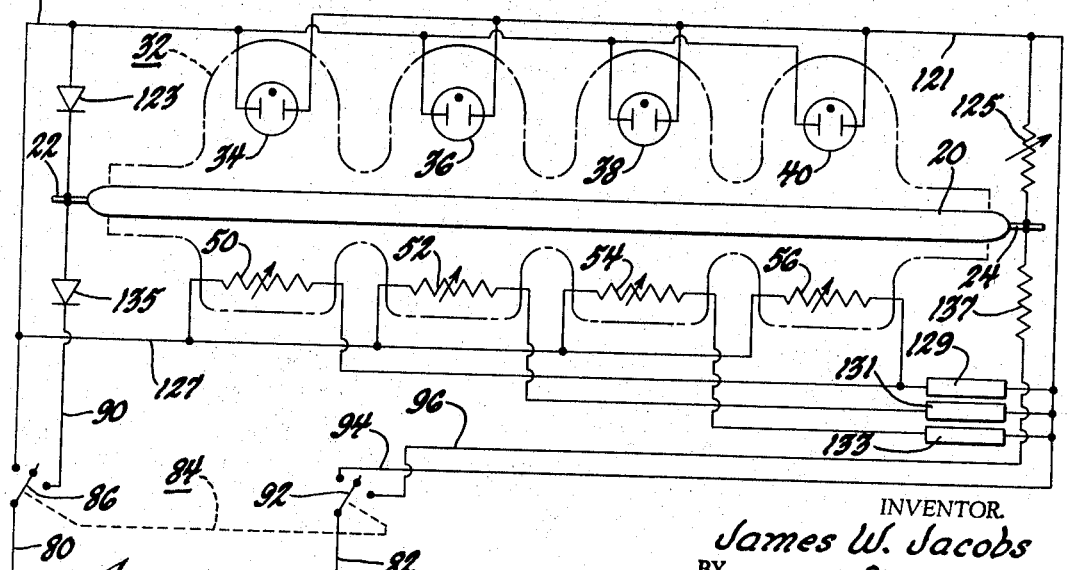
INVENTOR.
James W. Jacobs
BY
Carl A. Stickel
HIS ATTORNEY

United States Patent Office 3,321,635
Patented May 23, 1967

3,321,635
COULOMETRIC CONTROL
James W. Jacobs, Dayton, Ohio, assignor to General Motors Corporation, Detroit, Mich., a corporation of Delaware
Filed Feb. 5, 1964, Ser. No. 342,752
8 Claims. (Cl. 250—218)

This invention pertains to a domestic appliance and more particularly to timing controls for electrical apparatus and domestic appliances.

Timing controls of the general type illustrated in Patent No. 2,502,823, issued Apr. 4, 1950, have been used for many years. However such controls have not been completely satisfactory because of the wear and mechanical and electrical failures, frequently involving the motor, the drive mechanism and the contact mechanisms.

It is an object of this invention to provide an efficient, long life, trouble-free, inexpensive timing control which avoids the use of a motor, drive mechanism and contact mechanisms.

It is another object of this invention to provide an efficient, long life, trouble-free, inexpensive timing control which avoids the use of a motor, drive mechanism and contact mechanisms which will consecutively control a plurality of electrical elements or devices.

It is another object of this invention to provide a system in which the movement of a translucent electrolyte between a source of rays and a ray responsive device is employed to control an electrical load.

It is another object of this invention to provide a system in which the movement of a translucent electrolyte between a light source and a light dependent resistance is employed to control an electrical load.

It is still another object of this invention to provide a system in which the movement of a translucent electrolyte between a series of separate sources of rays and a series of ray responsive devices is employed to control a separate electrical load associated with each ray responsive device.

These and other objects are attained in the form shown in the drawings in which a small bore tube of glass is provided with electrical terminals at the opposite ends which are connected through a rectifier to a power source. The small bore contains a transparent electrolyte in the form of a water solution of potassium and mercuric iodide which is located between two columns of mercury. Surrounding the tube is an enclosure of opaque material containing four neon lights which are axially spaced along one side of the tube. Upon the opposite side of the tube the enclosure is provided with four light dependent resistors which have three electrical loads connected in series with them. Two of the light dependent resistors are connected in parallel with each other and in series with one of the loads while the other two light dependent resistors have only one load connected in series with each.

The opaque enclosure has passages for light rays extending from each of the neon light sources through the glass tube to the opposite light dependent resistance. A variable resistance is connected in series with the tube and the rectifier and connected to the same power source as energizes the neon lights, the light dependent resistances and the electrical load. The interior wall of the tube is treated with a thin film of a hydrophobic organo silicone polymer such as polydimethylsiloxane resin. When the supply switch is closed, current will flow from one of the electrodes through the mercury, the electrolyte and the second mercury column to the other electrode. A quantity of mercury from one column will go into the solution with the electrolyte and a like quantity will go out of the solution from the electrolyte onto the other column of mercury. This will cause the electrolyte to be displaced along the bore at a speed which will be governed by the current flow. As long as the applied potential and the electrical resistance remain constant, the current flow and the movement of the electrolyte will remain constant so that it serves as a timing device.

The mercury is opaque to the transmission of light so that the light dependent resistances will not conduct until the electrolyte is aligned between one of the neon bulbs and one of the light dependent resistances. When this occurs the light dependent resistance will conduct and energize the electrical load or device which is connected in series with it. When the electrolyte reaches the opposite end of the tube the current flow through the tube is reversed while the light dependent resistances and the electrical loads are de-energized so that the electrolyte can be returned to the starting position.

Further objects and advantages of the present invention will be apparent from the following description, reference being had to the accompanying drawings wherein a preferred embodiment of the present invention is clearly shown.

In the drawing:

FIGURE 1 is a longitudinal sectional view through a timing device embodying one form of my invention;

FIGURE 2 is a transverse sectional view taken along the line 2—2 of FIGURE 1;

FIGURE 3 is a fragmentary longitudinal sectional view similar to the left portion of FIGURE 1 showing the displacement of the electrolyte along the bore of the tube, and FIGURE 4 is a wiring diagram of the timing system.

Referring now to the drawing and more particularly to FIGURE 1, there is shown a long small bore tube 20, preferably of glass, such as is used for thermometers, having imbedded in the opposite ends the stainless steel electrodes 22 and 24. The glass 20 is transparent. However if desired other transparent materials such as polystyrene, polymethylmethacrylate, or transparent epoxy resin may be used for the tube 20. Preferably the material of the tube 20 has a coefficient of cubical expansion substantially equal to that of mercury.

The tube 20 preferably has a uniform circular bore of a diameter of 3 mils or less. It contains two columns 26 and 28 of liquid metal such as mercury. A small quantity or a droplet of a suitable electrolyte solution 30 fills all the space between the two columns so that it is in good conductive contact with the adjacent ends of both columns 26 and 28. The size of the droplet of electrolyte solution 30 is preferably sufficient to make its length about one to three times the diameter of the bore.

The electrolyte 30 is composed of a water solution of one or more metal salts. The salt or salts are chosen so that the electric current flowing from one column of the liquid metal to the other column causes mercury to be reversibly plated into and out of the solution over a range of current densities without the formation of gases or precipitates. A suitable electrolyte is a water solution of potassium iodide and mercuric iodide. This solution preferably is composed of 750 grams of potassium iodide per liter of water and 225 grams of mercuric iodide per liter of water.

According to my invention, the tube 20 is provided with an opaque enclosure 32 which extends substantially its entire length. This enclosure 32 is of opaque material such as opaque polystyrene, opaque epoxy resin, opaque vinyl or vinylidenchloride or acetate polymers or copolymers, opaque phenolic resins, or opaque natural or synthetic rubbers. These materials may be made opaque through the use of fillers such as carbon black. The enclosure 32 on one side of the tube 20 is provided with recesses containing the neon bulbs 34, 36, 38 and 40. These recesses such as recess 44 each extend transverse to the tube 20 and have an open end 42 through which there may be inserted a light source such as a neon bulb 36 having protruding terminals 46 and 48 projecting from the open end 42.

Directly on the opposite side of the tube 20 the enclosure 32 is provided with a series of light dependent resistances 50, 52, 54, and 56, each of which have a set of terminals projecting through identical removable covers 58 forming part of the enclosure 32. These light dependent resistances are located diametrically opposite the neon lights. These resistances such as for example, the light dependent resistance 50 have the terminals 60 and 62 projecting through the removable cover 58 for connection to the electrical circuit.

Extending from each of the neon bulbs to the tube 20 is a passage for light rays. These passages may be made of various configurations. For example, the neon bulb 34 may be provided with a passage 64 for rays which converges toward the tube 20 so that at the portion nearest the tube 20 it only has a very short axial length. This will minimize the period during which the electrolyte 30 will be in registration with adjacent portion of passage 64. Upon the opposite side of the tube 20 there likewise may be provided a passage 66 for rays which likewise may converge as it extends from the light dependent resistance 50 to the tube 20. The portion of the passages 64 and 66 nearest the tube may have only a very short axial length so that the period during which the rays from the neon bulb 34 pass through the moving electrolyte 30 to the light dependent resistance 50 is quite limited. This will also be limited by the length of the droplet of electrolyte 30. This droplet can be made as short as one diameter of the tube 20 if desired. A longer period of time may be provided for the energization of the light dependent resistance such as is illustrated relative to the passages 68 and 70 which provide for the passage of light rays from the neon bulb 36 through the tube 20 and the electrolyte 30 to the light dependent resistance 52. The passages 68 and 70 are less converging than the passages 64 and 66 and therefore have a considerably longer opening in the axial direction at the bore 20 so that they will provide a correspondingly longer period for the passage of light rays through the electrolyte 30 for energization of the light dependent resistance 52.

The passage 72 diverges between the neon bulb 38 and the tube 20 and the passage 74 converges from an elongated base at the tube 20 to the light dependent resistance 54 to provide a considerably longer open portion in contact with the tube 20 in the axial direction thereof to provide a correspondingly longer period of light transmission through the electrolyte 30 for energization for the light dependent resistance 54. Rays will be transmitted from the neon bulb 38 to the light dependent resistance 54 as long as a substantial portion of the electrolyte 30 is aligned with the ends of the passages 72 and 74 along the tube 20.

Passage 76 extends from the neon bulb 40 to the tube 20 while the corresponding passage 78 extends from the light dependent resistance 56 to the tube 20. The passage 76 may be made straight and the passage 78 may converge as it extends from the light dependent resistance 56 to the tube 20 so as to provide a period of tranmission of light rays through the electrolyte 30 for energization of the light dependent resistance 56 which is intermediate in length of the period of energization of the light dependent resistances 52 and 54.

One example of an electrical circuit arrangement for my improved timing device is shown in FIGURE 4. The supply conductors 80 and 82 are connected through a double pole, double throw switch 84 having one double throw switch blade 86 adapted to make electrical contact alternately with the conductors 88 and 90 and a second double throw switch blade 92 adapted to make electrical contact alternately with the electrical conductors 94 and 96. The switch blades 86 and 92 are connected for simultaneous operation and have each intermediate "Off" position. The neon bulbs 34, 36, 38, and 40 each have one terminal connected to the conductor 88 and a second terminal connected to the conductor 121 which in turn connects to the conductors 94. Therefore, whenever the switch 84 is moved so that the switch members 86 and 92 connect with the conductors 88 and 94, the neon bulbs 34, 36, 38, and 40 will be energized by being connected in parallel across the supply conductors 80 and 82.

The conductor 88 is connected through a semiconductor rectifier 123 with the electrode 22 at the left end of the tube 20. The conductor 121 is connected through the variable resistance 125 with the electrode 24 at the right end of the tube 20. This will provide a unidirectional flow of current through the tube 20 which will flow at a rate in accordance with the adjustment of the resistance 125. The resistance 125, therefore, can be used to select the rate of operation of the timer. As long as the switch 84 remains in the position connecting with the conductors 88 and 94, the unidirectional flow of current through the tube 20 from the electrode 22 to the electrode 24 will cause mercury from the column 28 on the right to go into solution in the electrolyte 30 and also will cause mercury to plate out of the electrolyte 30 onto the column 26.

It is assumed that for a normal start the electrolyte 30 will be to the left of the passage 64. This electrolytic plating action from the column 28 through the electrolyte 30 to the column 26 will cause the electrolyte 30 to gradually move to the right at a uniform rate. As soon as any substantial portion of the electrolyte 30 is positioned between the adjacent ends of the passages 64 and 66, light will be transmitted from the neon bulb 34 to the light dependent resistor 50 which will cause the light dependent resistor 50 to conduct. The conductor 88 is connected by the conductor 127 to one terminal of each of the light dependent resistances 50 and 56 and connected to one terminal of the electrical load 129 having its opposite terminal connected to the conductor 94. Therefore when the light dependent resistance 50 is made conductive it will allow current flow through the electrical load 129. This will continue as long as the electrolyte 30 is located between the light passages 64 and 66. At the end of this period of time the mercury column 26 will have its inner end moving between the adjacent ends of the passages 64 and 66 to block further transmission of light from the neon bulb 34 to the light dependent resistance 50 so as to stop the resistance 50 from conducting.

The continuing electrolytic action will cause the electrolyte 30 to continue to move to the right until it reaches the passages 68 and 70. As soon as the electrolyte 30 is between passages 68 and 70, the neon bulb 36 will transmit light rays through these passages and the tube 20 and the electrolyte 30 to the light dependent resistance 52 which will cause it to conduct as long as the electrolyte 30 is between these two passages. This light dependent resistance 52 has its second terminal connected to one terminal of the electrical load 131 having its other terminal connected to the conductor 94. The light dependent resistance 52 will therefore conduct current to the load 131 until the column 26 is built up sufficiently to move between the passages 68 and 70 to block the flow of light rays from the neon bulb 36 to the light dependent resistance 52 so as to stop this resistance 52 from conducting current to the load 131. The period of time during which the light dependent resistance 52 will conduct will depend on the width of the passages 68 and 70 in the direction of the axis of the tube 20 and the length of the electrolyte 30 as well as the adjustment of the resistance 125.

The continuing of the electrolytic action in the tube 20 will cause the column 26 to grow longer and move the electrolyte 30 to the right until it moves in between the passages 72 and 74. This will cause rays to be transmitted from the neon bulb 38 to the light dependent resistance 54 as long as any substantial portion of the electrolyte 30 is between these two passages. Since the width of these passages 72 and 74 is long in the direction of the axis of the tube 20, the light dependent resistance 54 will be made conducting for a corresponding long period of time. This will cause the electrical load 133 which is connected between the second terminal of light dependent resistance 54 and the conductor 94 to be energized for a correspondingly long period of time. The period of conduction will end when the column 26 moves in to completely block the transmission of light rays between the passages 72 and 74.

Continuation of the electrolytic action will cause the column 26 to continue to grow at the expense of the column 28 to continue to move the electrolyte 30 to the right until it moves in between the passages 76 and 78. The light rays from the neon bulb 40 will pass through the passage 76, the tube 20, the electrolyte 30 and the passage 78 to the light dependent resistance 56 to cause this resistance to conduct current to the electrical load 129 for a period as long as the electrolyte 30 is positioned between the passage 76 and 78. This will continue until the electrolytic action will move the electrolyte 30 to the right of the passages 76 and 78 which will complete the cycle of the timing mechanism and deenergize the loads 129, 131, and 133.

At the end of the timing cycle, the switch 84 is moved to place the switch blades 86 and 92 in an intermediate position intermediate the conductors 88 and 90 and intermediate the conductors 94 and 96. This will deenergize all circuits. To return the timing control to the starting position the switch 84 is moved so that the switch blade 86 engages the conductor 90 and the switch blade 92 engages the conductor 96. The conductor 90 is connected through the semiconductor diode 135 with the terminal 22. This diode 135 is reversely arranged as compared to the diode 123 so that it will allow current flow only in a direction of flow opposite to that of diode 123. The conductor 96 is connected through a fixed resistance 137 with the electrode 24. This will cause a reverse flow of current through the tube 20 at a rate which will be determined by the resistance 137. This will cause plating through the electrolyte 30 in the reverse direction to cause the column 28 to be built up at the expense of the column 26 so as to move the electrolyte 30 from the right to the left until it passes beyond the passages 64 and 66 at the opposite end of the tube 20. When this position is reached, the switch 84 will then be moved to the "Off" or intermediate position to remain there until it is desired to make a new start.

While I have described the neon bulbs as a source of light rays, it should be understood that other light sources and other sources of rays may be used if desired. Also I have described light dependent resistances, but other ray responsive devices may be used within the scope of my invention to control the different loads.

While the embodiment of the present invention as herein disclosed, constitutes a preferred form, it is to be understood that other forms might be adopted.

What is claimed is as follows:

1. A timing control including a body translucent to rays having a small diameter bore therein, first and second columns of liquid metal within said bore, said metal being opaque to rays, a translucent electrolyte within said bore separating and contacting the adjacent ends of said first and second columns, conducting means for connecting said columns to an external source of potential, an opaque enclosure substantially enclosing a major portion of said body containing a plurality of separate sources of light rays distributed alongside said bore and a separate light ray responsive device alongside said bore substantially diametrically opposite each of said sources of rays, said enclosure having separate light transmitting passages extending from each of said separate sources to said body and from said body to each of said diametrically opposed ray responsive devices and separate means individually electrically connected to each of said light ray responsive devices for control thereby, said enclosure having light ray shielding means between said sources of rays for preventing the transmission of rays from one source of rays to a light responsive device opposite another source of rays.

2. A timing control including a body translucent to rays having a small diameter bore therein, first and second columns of liquid metal within said bore, said metal being opaque to rays, a translucent electrolyte within said bore separating and contacting the adjacent ends of said first and second columns, electrical conducting means for connecting said columns to an external source of potential, an opaque enclosure substantially enclosing a major portion of said body containing a plurality of separate light sources distributed alongside said bore and a separate light dependent resistance located alongside said bore substantially diametrically opposite said light sources, said enclosure having a separate light transmitting passage between each of said light sources and the opposite light dependent resistance, and separate electrical means electrically connected in series circuit with each of said light dependent resistances.

3. A timing control including a body translucent to rays having a small diameter bore therein, first and second columns of liquid metal within said bore, said metal being opaque to rays, a translucent electrolyte within said bore separating and contacting the adjacent ends of said first and second columns, conducting means for connecting said columns to an external source of potential, an opaque enclosure substantially enclosing a major portion of said body containing a plurality of separate sources of light rays distributed alongside said bore, a separate light ray responsive device alongside said bore substantially diametrically opposite each of said source of rays, said enclosure having separate light transmitting passages extending from said separate sources to said body and from said body to said diametrically opposite ray responsive devices, a separate means individually electrically connected to each of said light ray responsive devices for control thereby, and means for reversing the potential applied to said columns and for coincidentally rendering ineffective said ray responsive devices.

4. A timing control including a body translucent to rays having a small diameter bore therein, first and second columns of liquid metal within said bore, said metal being opaque to rays, a translucent electrolyte within said bore separating and contacting the adjacent ends of said first and second columns, conducting means for connecting said columns to an external source of potential, an opaque enclosure substantially enclosing a major portion of said body containing a plurality of separate sources of light rays distributed alongside said bore and a separate light ray responsive device alongside said bore substantially diametrically opposite each of said sources of rays, said enclosure having separate light transmitting passages extending from said separate sources to said body and from said body to said diametrically opposite ray responsive devices, and a means individually electrically connected to each of said ray responsive devices for control thereby, said enclosure having light ray shielding means between said sources of rays for preventing the transmission of rays from one source of rays to a light responsive device opposite another source of rays, said passages having different widths between the shielding means to provide different lengths of time for transmitting rays from the respective sources to the light ray responsive device associated with them.

5. A timing control including a body translucent to light rays having a small diameter bore therein, first and second columns of liquid metal within said bore, said metal being opaque to light rays, a translucent electrolyte within said bore separating and contacting the adjacent ends of said first and second columns, electrical conducting means for connecting said columns to an external source of potential, a plurality of sources of light rays distributed alongside said body, an enclosure of material substantially opaque to said light rays substantially surrounding said body and said sources, a plurality of light ray responsive devices enclosed by said enclosure distributed alongside said body substantially opposite said sources, said enclosure having light transmitting passages for said light rays extending from said sources to said body and from said ray responsive devices to said body for the transmission of light rays from said sources through said body and said electrolyte to said ray responsive devices.

6. A timing control including a body translucent to light rays having a small diameter bore therein, first and second columns of liquid metal within said bore, said metal being opaque to light rays, a translucent electrolyte within said bore separating and contacting the adjacent ends of said first and second columns, electrical conducting means for connecting said columns to an external source of potential, a plurality of sources of light rays distributed alongside said body, an enclosure of material substantially opaque to said rays substantially surrounding said body and said sources, a plurality of light ray responsive devices enclosed by said enclosure distributed alongside said body substantially opposite said light sources, said enclosure having passages for said rays extending from said sources to said body and from said light ray responsive devices to said body for the transmission of rays from said sources through said body and said electrolyte to said light ray responsive devices, said enclosure being provided with removable covers for said ray responsive devices.

7. A timing control including a body translucent to light rays having a small diameter bore therein, first and second columns of liquid metal within said bore, said metal being opaque to light rays, a translucent electrolyte within said bore separating and contacting the adjacent ends of said first and second columns, electrical conducting means for connecting said columns to an external source of potential, a plurality of light sources distributed alongside said body, an enclosure of material substantially opaque to light substantially surrounding said light sources and said body, a plurality of light dependent resistances enclosed by said enclosure distributed along said body substantially opposite said light sources, said enclosure having light transmitting passages for light rays extending from said light sources to said body and from said light dependent resistances to said body for the transmission of light rays from said light sources through said body and said electrolyte to said light dependent resistances.

8. A timing control including a body translucent to rays having a small diameter bore therein, first and second columns of liquid metal within said bore, said metal being opaque to rays, a translucent electrolyte within said bore separating and contacting the adjacent ends of said first and second columns, electrical conducting means for connecting said columns to an external source of potential, a plurality of light sources distributed alongside said body, an enclosure of material substantially opaque to light substantially surrounding said light sources and said body, a plurality of light dependent resistances enclosed by said enclosure distributed along said body substantially opposite said light sources, said enclosure having light transmitting passages for light rays extending from said light sources to said body and from said light dependent resistances to said body for the transmission of light rays from said light sources through said body and said electrolyte to said light dependent resistances, said enclosure being provided with removable covers for said light dependent resistances.

References Cited by the Examiner
UNITED STATES PATENTS

| | | | |
|---|---|---|---|
| 2,946,954 | 7/1960 | Fitch | 324—94 |
| 3,045,178 | 7/1962 | Corrsin | 324—94 |
| 3,193,763 | 7/1965 | Beusman | 324—68 |
| 3,249,724 | 5/1966 | Hurvitz | 324—94 |

RUDOLPH V. ROLINEC, *Primary Examiner.*

WALTER L. CARLSON, *Examiner.*

P. F. WILLE, *Assistant Examiner.*